Aug. 8, 1961 H. M. SHARAF 2,995,668

COMPENSATED TRANSISTOR TRIGGER CIRCUIT

Filed Oct. 14, 1958

INVENTOR
HAROLD M. SHARAF

BY Fred Jacob
ATTORNEY 2,995,668

COMPENSATED TRANSISTOR TRIGGER CIRCUIT

Harold M. Sharaf, Cochituate, Mass., assignor to Laboratory for Electronics, Inc., Boston, Mass., a corporation of Delaware Filed Oct. 14, 1958, Ser. No. 767,131
7 Claims. (Cl. 307—88.5)

The present invention relates in general to new and improved transistor trigger circuits. More specifically the invention relates to a stabilized transistor trigger circuit which is capable of reliable performance over a wide range of ambient temperature conditions as well as variations of transistor characteristics and circuit components.

Heretofore, one of the most important sources of instability in transistor trigger circuits of the type described herein has been the well known sensitivity of transistors to temperature changes. Other sources of instability include changes of the characteristics of the transistors as well as of the associated circuit components. Different attempts at compensating for these changes have met with varying degrees of success. In the case of temperature compensation a compensating impedance is generally connected to the base of the output transistor, said impedance having a temperature characteristic which tends to balance out temperature-originating voltage changes. Other schemes include varying the reference potentials employed in accordance with the expected variations, or varying the amplitude of the input signal, or a combination of the foregoing. None of these attempts has been entirely successful in the past to compensate for voltage variations due to temperature changes, or for changes of transistor characteristics and circuit components, while unduly increasing the total cost of the particular circuit.

Figure 1:
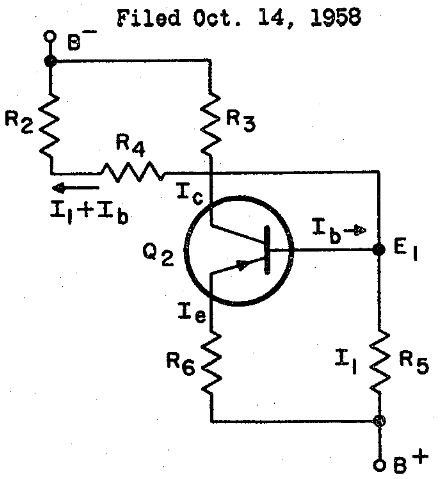
Figure 2:
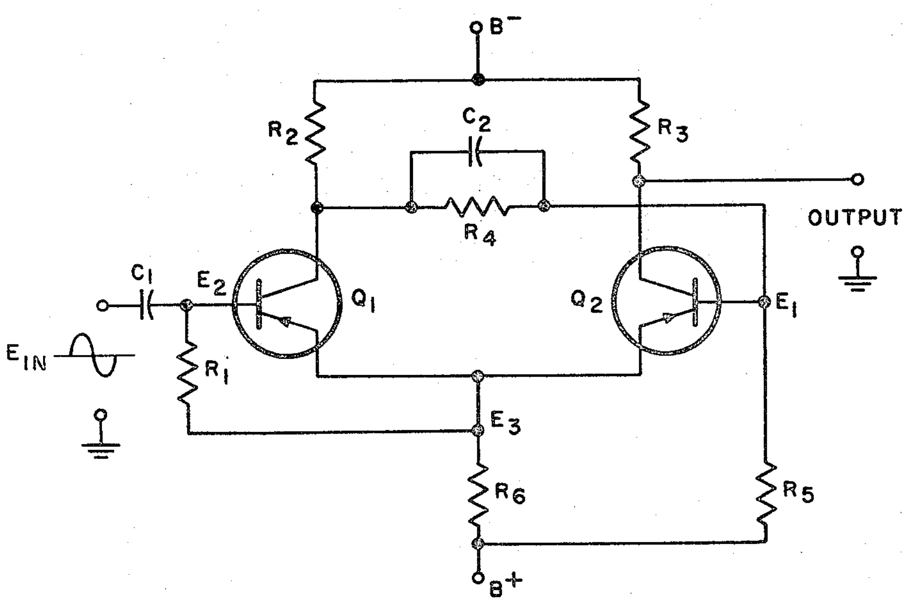

Accordingly, it is the primary object of the invention herein to provide a stable transistor trigger circuit which is simple and economical in construction. Further objects of the invention will become more apparent from the following detailed specification with reference to the accompanying drawings in which:

FIG. 1 illustrates the equivalent circuit of an uncompensated transistor operating in a trigger circuit; and FIG. 2 illustrates a compensated transistor trigger circuit which comprises the invention herein.

With reference now to the drawings, FIG. 1 shows the equivalent circuit of a transistor $Q_2$ while the latter is operating in a trigger circuit under essentially saturated conditions at elevated temperatures.

A source of negative potential $B^-$ is connected to the collector of transistor $Q_2$ by means of resistor $R_3$, $I_c$ being the collector current. Source $B^-$ is further connected to the base of transistor $Q_2$ by means of resistors $R_2$ and $R_4$, the current flowing in the last recited connection comprising $(I_1+I_b)$, as indicated in the drawing. The transistor base is further connected to a source of positive D.C. potential by means of resistor $R_5$ such that a current $I_1$ flows in this connection. The emitter is tied to the aforesaid source of positive D.C. potential by means of resistor $R_6$, the emitter current being indicated as $I_e$. The voltage at the base of the transistor is seen to be $E_1$.

It can be shown that voltage $E_1$ approximates the following relationship:

$$E_1=B^+-R_5I_1$$

$$I_1=\frac{B^+-E_1}{R_5}$$

If $I_b$=base current, $$(B^++B^-)=I_1R_5+(I_1+I_b)(R_4+R_2)$$
$$(B^++B^-)=I_1(R_5+R_2+R_4)+I_b(R_2+R_4)$$

$$\left[\frac{B^++B^--I_b(R_2+R_4)}{R_2+R_4+R_5}\right]=I_1$$

$$\therefore E_1=B^+-R_5\left[\frac{(B^++B^-)-I_b(R_2+R_4)}{R_2+R_4+R_5}\right]$$

Now $I_b=I_{b0}+SI_{c0}$ where $I_{b0}$=normal D.C. base current.
$S\geq 1$=circuit constant.
$I_{c0}$=base current which would flow with emitter open.

$$=I'_{c0}\times 2^{\frac{T-25^\circ\text{ C.}}{11^\circ\text{ C.}}}$$

where $I'_{c0}$=transistor current at room temperature.

It can be seen, therefore, that $E_1$ is a function of $B^+$, $B^-$, transistor characteristics and resistor component tolerances. Normal variations in $E_1$ are of the order of 5 volts for $B^+=+20$ volts, $B^-=-20$ volts, $T=70°$ C., and $S=3$. In order for this circuit to perform as a trigger circuit it will be necessary for the input signal to increase by at least 5 volts. The invention herein reduces the dependence of the input signal on the ambient temperature operating point and on transistor and circuit component tolerances to an extent where the variation in $E_1$, and hence the required variation in the input signal level, is negligible.

FIG. 2, which illustrates the invention herein, shows a trigger circuit comprising transistors $Q_1$ and $Q_2$, each of which has a base, an emitter and a collector indicated in conventional manner. A source of negative D.C. potential is connected to the collector of transistor $Q_1$ by means of resistor $R_2$. In similar manner, source $B^-$ is connected to the collector of transistor $Q_2$ by means of resistor $R_3$. The emitters of respective transistors are tied together in a common junction point and are connected to a source of positive D.C. potential $B^+$ by means of feedback resistor $R_6$. Input condenser $C_1$ is connected to the base of transistor $Q_1$, said base additionally being connected to the aforesaid junction point by means of resistor $R_1$. The crossover networks which produce the trigger operation comprise resistor $R_4$ and by-pass condenser $C_2$ connected between the collector of transistor $Q_1$ and the base of transistor $Q_2$, as well as resistor $R_5$ which is connected to the aforesaid junction point through feedback resistor $R_6$. The input signal $E_{in}$ is applied to input condenser $C_1$ which in turn is tied to the base of transistor $Q_1$. Output signals are derived from the collector of transistor $Q_2$.

In operation, in the absence of an input signal $E_{in}$, transistor $Q_1$ is operating under cutoff conditions, while transistor $Q_2$ is operating under essentially saturated conditions. The aforesaid crossover networks $R_4$, $C_2$, $R_5$ and the feedback resistor $R_6$ hold transistor $Q_1$ in the cutoff or zero current condition. Whenever the input signal instantaneously drives the base of $Q_1$ negative with respect to ground by an amount equal to the total bias voltage developed between the aforesaid junction point and ground, transistor $Q_1$ is driven into conduction and transistor $Q_2$, through the action of the crossover networks, is driven to cutoff. When the input signal returns to a point above ground potential, transistor $Q_1$ ceases to conduct and $Q_2$ returns to its saturated condition.

The switching point between the conductive and nonconductive state of $Q_1$ is dependent on the difference voltage $E_2-E_3$, $E_2$ being the voltage obtaining at the base of transistor $Q_1$, and $E_3$ being the voltage at the junction point. $E_3$ is directly related to $E_1$ by virtue of connection $R_5$, $R_6$. Accordingly, within proper design limits any variation of $E_1$, such as a variation due to changes of temperature or of transistor or component constants, will be reflected in the magnitude of $E_3$. By virtue of the coupling function of resistor $R_1$, the junction point is tied to the base of transistor $Q_1$. As a result, the reference potential of the base of transistor $Q_1$ is equal to $E_3$ and the input signal need not increase in amplitude due to a variation of $E_2$. The latter is true since transistor $Q_1$ continues to be referenced to the difference voltage $E_2-E_3$. The above described circuit thus provides a simple technique for stabilizing a transistorized trigger circuit against expected variations in ambient temperature, transistor characteristics, resistive components etc. The technique described herein is applicable to transistors of the PNP type as well as to transistors of the NPN type. A reliable trigger circuit is obtained while switches only in accordance with the input signal applied.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. A trigger circuit comprising, first and second transistors each having a base, an emitter and a collector, respective emitters being connected to a common junction point, means for applying input signals to said first transistor base, impedance means directly coupling said first transistor base to said junction point, a crossover network including a feedback impedance for coupling said second transistor base to said first transistor collector and said junction point respectively, means for coupling a first reference potential to said junction point through said feedback impedance, means for coupling a second reference potential to respective transistor collectors, and means for deriving output signals from said second transistor.

2. A compensated trigger circuit comprising first and second transistors, first and second junction points coupled to each other through a resistor, said first transistor having its base and emitter connected to said first and second junction points respectively, a third junction point resistively coupled to said second junction point, said last recited coupling including a feedback resistor, said second transistor having its emitter and base connected to said second and third junction points respectively, impedance means coupling said first transistor collector to said third junction point, means for coupling a first D.C. potential to said second junction point through said feedback resistor, resistive means for coupling a second D.C. potential to respective transistor collectors, means for applying input signals to said first junction point, and means for deriving output signals from said second transistor collector.

3. A stabilized trigger circuit comprising first and second transistors each having a base, an emitter and a collector, respective emitters being connected to a common junction point, means for applying input signals to said first transistor base, resistive means directly coupling said last recited base to said junction point, means for deriving output signals from said second transistor collector, means for impedance coupling said first transistor collector to said second transistor base, means for applying a positive D.C. potential to said junction point through a feedback impedance, means for impedance coupling said junction point through said feedback impedance to said second transistor base, and means for impedance coupling a negative D.C. potential to respective transistor collectors.

4. A trigger circuit comprising first and second transistors each having a base, a collector and an emitter, respective emitters being tied together, means for coupling a first D.C. potential to respective collectors, means including a feedback impedance for coupling a second D.C. potential to the junction of respective emitters, means for coupling said first transistor collector to said second transistor base, means for coupling said second transistor base to said junction through said feedback impedance, resistive means directly coupling said first transistor base to said junction, means for applying input signals to said first transistor base, and means for deriving output signals from said second transistor collector.

5. A stabilized trigger circuit comprising first and second transistors each having a base, an emitter and a collector, respective emitters being connected together, means for applying signals to the base of said first transistor, a first resistor having one terminal thereof connected to the junction of said emitters, a second resistor connected intermediate said first transistor base and said junction, a third resistor connected intermediate said second transistor base and the other terminal of said first resistor, fourth and fifth resistors being joined at one terminal and having the other terminals connected to respective collectors of said transistors, a sixth resistor shunted by a capacitor and connected intermediate said first transistor collector and said second transistor base, means for applying a positive D.C. potential to said joined terminals of said fourth and fifth resistors, means for applying a negative D.C. potential to said other terminal of said first resistor, and means for obtaining output signals from said second transistor collector.

6. A stabilized trigger circuit comprising first and second transistors each having a base, an emitter and a collector, an input terminal, means for capacitively coupling said input terminal to said first transistor base, respective transistor emitters being connected together, first and second resistors joined at one terminal thereof, means for applying a positive D.C. potential with respect to a reference point to said joined terminals, the other terminals of said first and second resistors being connected to the junction point of said emitters and said second transistor base respectively, a third resistor connected intermediate the base and the emitter of said first transistor, fourth and fifth resistors joined at one terminal thereof, means for applying a negative D.C. potential with respect to said reference point to said last recited joined terminals, the other terminals of said fourth and fifth resistors being connected to respective collectors of said transistors, a sixth resistor capacitively shunted connected intermediate said first transistor collector and said second transistor base, and an output terminal connected to the collector of said second transistor.

7. An electronic trigger circuit comprising a first transistor, a source of direct current electric potential, a resistive network connected across said source, the base of said first transistor being connected to a point on said network providing a bias potential causing said first transistor normally to conduct current, a second transistor, the emitters of both transistors being connected together, a resistor connecting the emitters of both transistors to one side of said source, a resistor directly connecting the emitter and base of the second transistor, means for applying a signal to the base of said second transistor to cause current conduction therein, and means for coupling signals from the collector of said second transistor to the base of said first transistor.

References Cited in the file of this patent

UNITED STATES PATENTS

| | | |
|---|---|---|
| 2,470,028 | Gordon | May 10, 1949 |
| 2,772,359 | Modiano | Nov. 27, 1956 |
| 2,814,736 | Hamilton | Nov. 26, 1957 |